O. FREDRICKSON.
Portable Hand-Windlass.
No. 203,333. Patented May 7, 1878.
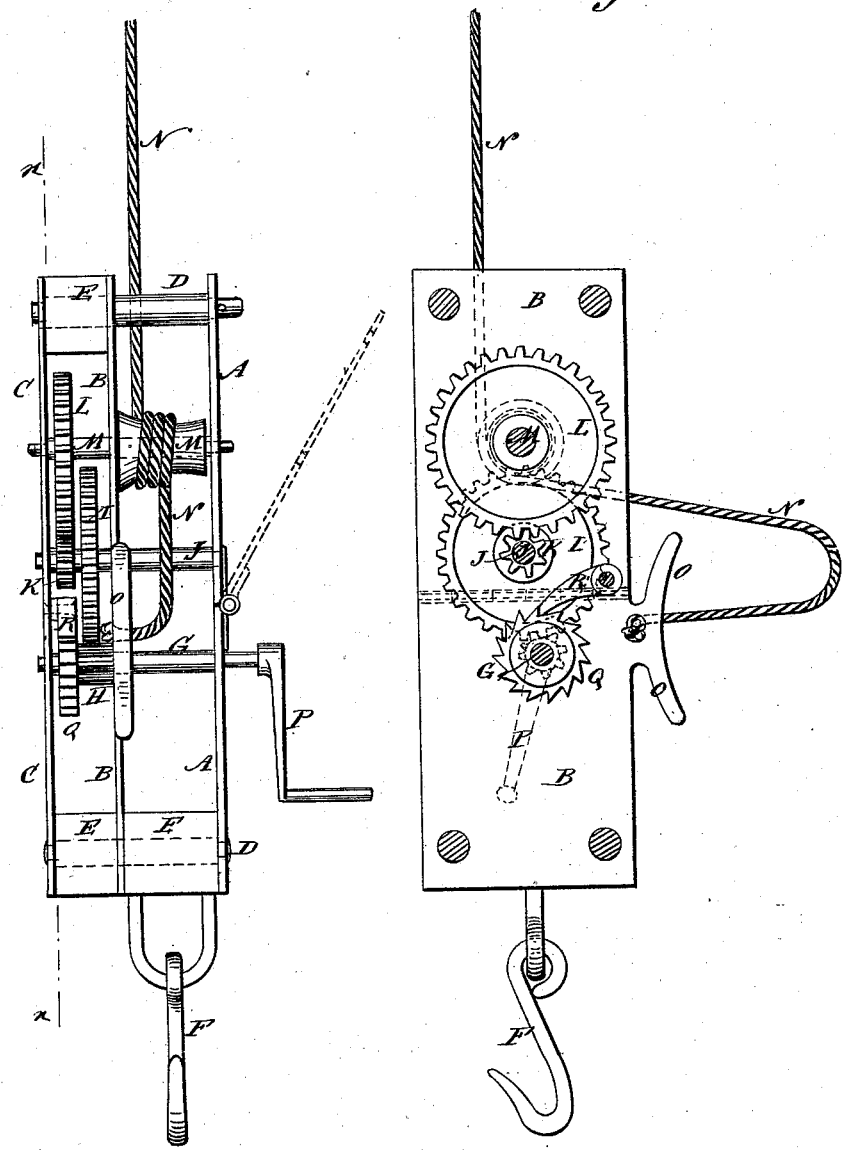
WITNESSES:
C. Neveux
C. Sedgwick
INVENTOR:
O. Fredrickson
BY Munn & Co.
ATTORNEYS.

UNITED STATES PATENT OFFICE.

ORLEFF FREDRICKSON, OF NEW YORK, N. Y.

IMPROVEMENT IN PORTABLE HAND-WINDLASSES.

Specification forming part of Letters Patent No. 203,333, dated May 7, 1878; application filed April 3, 1878.

*To all whom it may concern:*

Be it known that I, ORLEFF FREDRICKSON, of New York city, in the county and State of New York, have invented a new and useful Improvement in Movable Hand - Windlasses, of which the following is a specification:

Figure 1 is a front view of my improved device. Fig. 2 is a side view of the same, one of the side plates being removed, and the shafts and bolts being shown in section through the line *x x*, Fig. 1.

Similar letters of reference indicate corresponding parts.

The object of this invention is to furnish an improved device for hauling lines in raising sails and other similar purposes, which shall be simple in construction, convenient in use, and effective in operation, enabling one or two men to do the work which otherwise would require eight or ten.

The invention consists in the combination of the three plates, connected by blocks and bolts, the gear-wheels, the ratchet-wheel and pawl, the shafts, and the crank with each other.

A, B, and C are three parallel plates, which are connected together by bolts D, and are kept at the proper distance apart by blocks E interposed between their ends, or by shoulders formed upon the said bolts D. To the lower end of the frame A B C is attached a hook, F, for securing the windlass to an eye-bolt or other support. Through the lower part of the plates A B C passes a shaft, G, to which, between the plates B C is attached a small gear-wheel, H, the teeth of which mesh into the teeth of a larger gear-wheel, I, attached to the shaft J. The shaft J revolves in bearings in the middle parts of the plates A B C, and to it is also attached a small gear-wheel, K, the teeth of which mesh into the teeth of a larger gear-wheel, L, attached to the shaft M. The shaft M revolves in bearings in the upper part of the plates A B C; and around it, or around a spool attached to it, between the plates A B C, is passed one, two, or more coils of the rope N, one end of which is attached to the end of the line to be hauled upon, and its other end is attached to one of the plates A B C, to prevent it from becoming detached from the machine. To one of the plates A B C, at a suitable distance below the shaft M, is attached, or upon it is formed, a belaying-cleat, O, around which the rope N may be passed, to secure it in position, when desired. To one end of the shaft G is attached a crank, P, by which the device is operated.

In using the device, the end of the rope N is attached to the end of the line or other object to be hauled upon. A man takes hold of the rope N, to keep it taut upon the shaft M by hauling in the slack of the rope N, and to pass it around the belaying-cleat O, when required. Another man operates the crank P.

The plate A is made in two parts, hinged to each other, so that its upper part may be swung out, as shown in dotted lines in Fig. 1, to enable the rope to be removed from the shaft M, when desired, without passing its whole length over the said shaft M. To the shaft G is attached a ratchet-wheel, Q, with the teeth of which engages a pawl, R, pivoted to the plate C, to hold the gearing in any position into which it may be turned, and to prevent the gearing from being turned back by any sudden strain upon the rope N.

I am aware that it is not new in ships' capstans to use two independent sheaves in connection with three shafts and friction-wheels; but

What I claim is—

The combination, in a hand-windlass, with the frame A B C D, having belaying-pin O, of the shaft G having the gear-wheel H, shaft J having the gear-wheels I K, the shaft M having the gear-wheel L, and the rope N, as shown and described.

ORLEFF FREDRICKSON.

Witnesses:
JAMES T. GRAHAM,
C. SEDGWICK.